United States Patent [19]

Fleckenstein et al.

[11] Patent Number: 4,910,878
[45] Date of Patent: Mar. 27, 1990

[54] SUSPENDED-CABLE APPARATUS FOR MEASURING LEVEL OF MATERIAL IN A STORAGE VESSEL

[75] Inventors: Phillip P. Fleckenstein, Port Huron; Randall J. Regentin, Deckerville, both of Mich.; John T. Knepler, Chatham, Ill.

[73] Assignee: Berwind Corporation, Philadelphia, Pa.

[21] Appl. No.: 321,098

[22] Filed: Mar. 9, 1989

[51] Int. Cl.$^4$ .......................... G01B 3/10; G01F 23/04
[52] U.S. Cl. ........................................ 33/719; 33/715; 33/720; 73/321; 318/482; 364/567
[58] Field of Search ................. 73/296; 33/713, 714, 33/715, 716, 719, 720; 318/482

[56] References Cited

U.S. PATENT DOCUMENTS

| | | | |
|---|---|---|---|
| 3,500,546 | 3/1970 | Pilcher | 33/715 |
| 3,792,331 | 2/1974 | Wissmiller et al. | 318/482 |
| 4,188,726 | 2/1980 | Wemyss | 33/715 |
| 4,219,133 | 8/1980 | Sinsky | 33/716 X |
| 4,276,774 | 7/1981 | McGookin | 73/296 X |
| 4,483,047 | 11/1984 | Linville, Jr. | 364/567 X |
| 4,676,099 | 6/1987 | McGookin | 73/290 B |

Primary Examiner—Daniel M. Yasich
Attorney, Agent, or Firm—Barnes, Kisselle, Raisch, Choate, Whittemore & Hulbert

[57] ABSTRACT

Apparatus for indicating level of material comprises a cable vertically suspended so as to contact and be surrounded by the material. The cable is suspended from a cam follower mechanism that engages a cam coupled to a motor for selectively introducing slack in the cable, such that the upper portion of the cable unsupported by the material engages and is suspended from a load cell. Circuitry is responsive to cable weight measured by the load cell for indicating level of the material. The motor comprises a rotary electric motor having a horizontal axis of rotation perpendicular to the vertical cable. The cam comprises a cam plate coupled to the motor to rotate about the motor axis and having an asymmetric periphery surrounding the axis of rotation. The cam follower mechanism comprises an arm pivotally mounted in fixed position adjacent to the cam plate and supporting a roller that engages the cam plate periphery. The cable is suspended from the pivot-remote end of the arm, so that weight of the cable and the roller arm hold the roller in contact with the cam plate periphery. The level-indicating circuitry is microprocessor-based and includes facility for indicating level over a 4-20 ma current range, with automatic output correction for changeds in circuit characters.

37 Claims, 5 Drawing Sheets

U.S. Patent    Mar. 27, 1990    Sheet 1 of 5    4,910,878
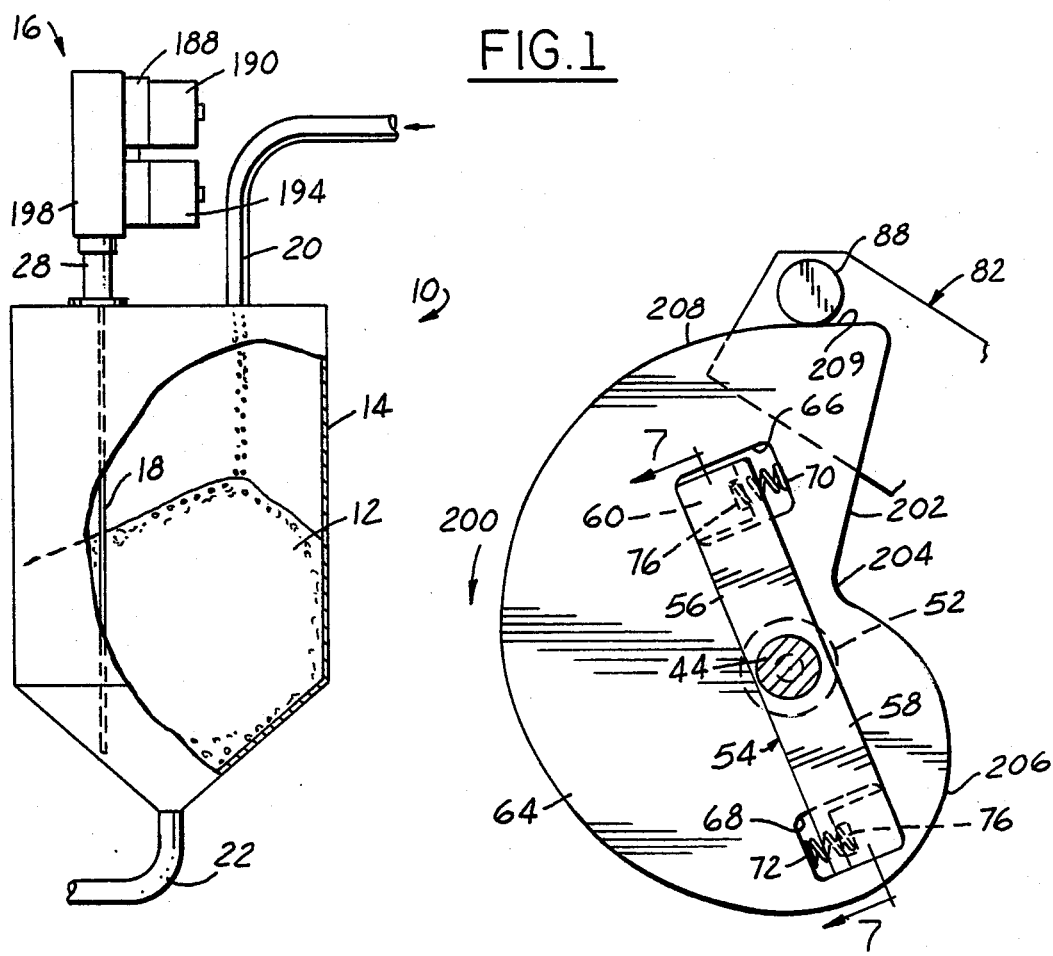
FIG. 1
FIG. 6
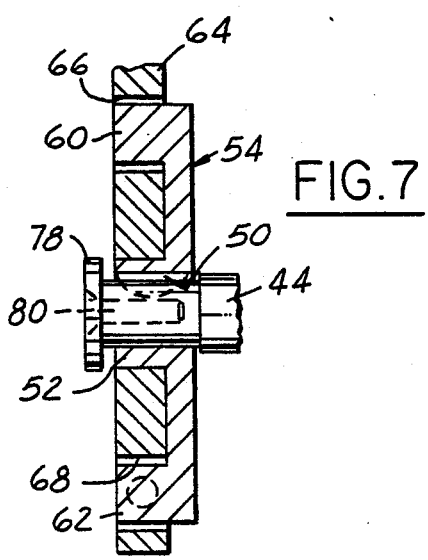
FIG. 7

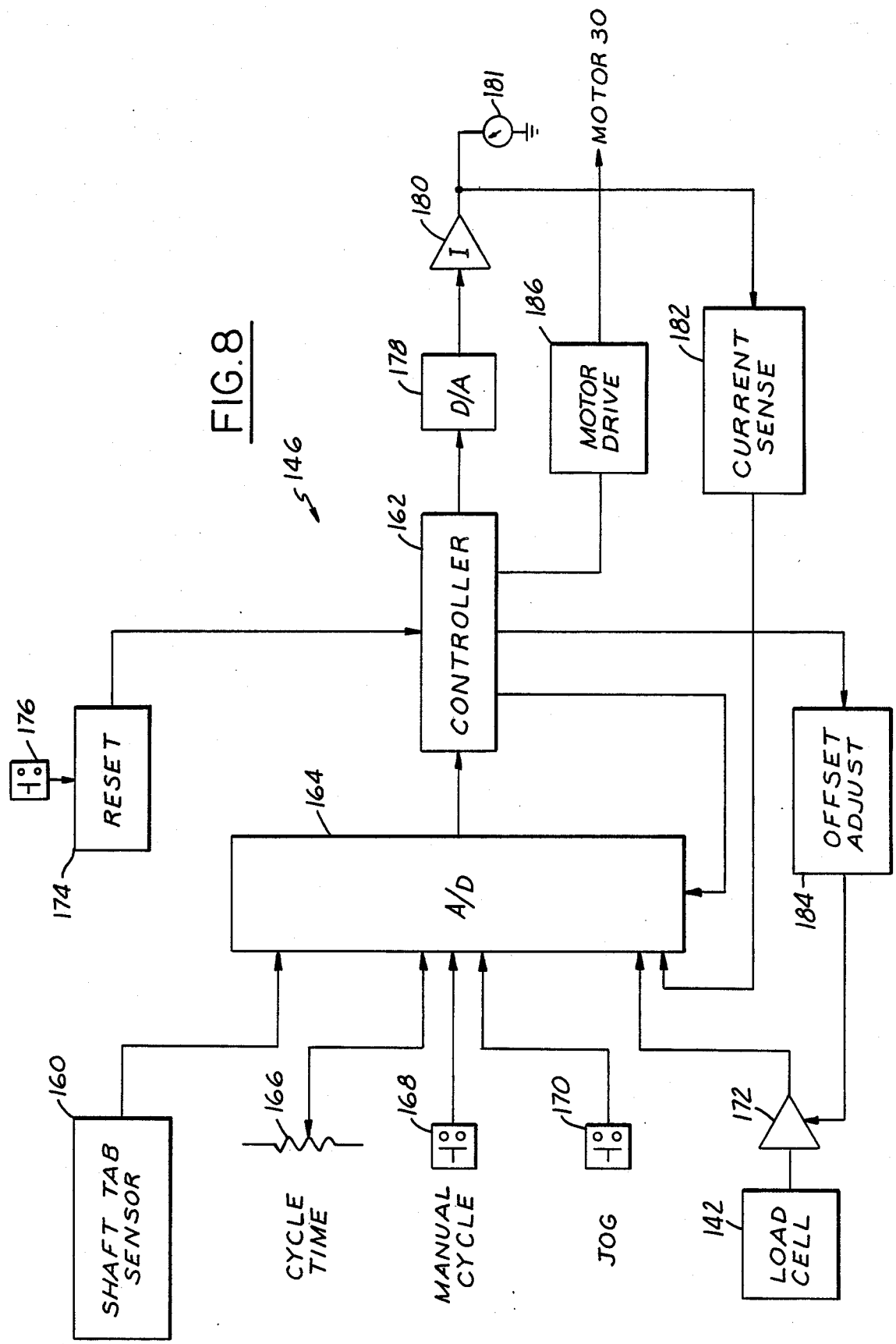

SUSPENDED-CABLE APPARATUS FOR MEASURING LEVEL OF MATERIAL IN A STORAGE VESSEL

The present invention is directed to apparatus for indicating a preselected condition of material as a function of effect of such material upon operating characteristics of a material probe, and more particularly to apparatus for indicating level of material as a function of weight of a suspended cable unsupported by the material.

BACKGROUND AND OBJECTS OF THE INVENTION

U.S. Pat. No. 4,276,774 discloses apparatus for measuring the level of flowable material in which a cable is vertically suspended above and into the material, such that the material surrounds and supports the lower portion of the cable. The upper portion of the cable is periodically or selectively slackened against a weighing device, such as a load cell, that provides a signal indicative of weight of the slackened portion of the cable unsupported by material, and thereby indicates level of material with respect to the cable length. In one embodiment of the apparatus disclosed in the noted patent, the cable is suspended from a pneumatic actuator. In another embodiment, an electric motor is operable through a lead screw assembly for raising and lowering the cable, while in a third embodiment the cable is suspended from a pulley drive by an electric motor. U.S. Pat. No. 4,676,099 discloses suspended-cable apparatus of the subject type that embodies certain improvements having particular utility when employing steel laid cable.

Although apparatus of the above-described type, particularly as disclosed in the latter-noted patent, have enjoyed substantial commercial acceptance and success, improvements remain desirable in certain areas. For example, mechanisms in apparatus heretofore proposed for lowering and raising the cable have not proven to be entirely satisfactory for use in conjunction with long cables or chain-type cables that may be subjected to heavy loads as the cable is raised. Motor-driven cable suspension mechanisms proposed in the art are not sufficiently powerful and robust for most applications, while pneumatic actuators require provision of a compressed air line, which is not always convenient in the field. Further, the suspended cable can be subjected to heavy shock loads when the surrounding vessel is being filled, and apparatus heretofore proposed have not provided a mechanism for absorbing such shock loads, and thereby preventing damage to the cable and suspension mechanism.

It is therefore an object of the present invention to provide suspended-cable apparatus of the described character that is particularly well adapted for operation in conjunction with long or heavy cables, and/or that includes facility for absorbing shock loads on the cable and thereby protecting the cable and suspension mechanism from damage. Another object of the present invention is to provide suspended-cable apparatus of the described character that satisfies industry standards for so-called explosion-proof housings, which are required for insurance reasons in many applications. Yet another object of the present invention is to provide suspended-cable apparatus of the described character that is economical to manufacture and install, and that is reliable in operation over an extended product life.

A further object of the present invention is to provide apparatus for measuring a preselected condition of materials, such as material level, over a predetermined operating range and for providing an analog current output over a selected range, such as the standard 4 ma to 20 ma current range, corresponding to the preselected material condition range, and in which the current output is closely regulated and compensated for variations that might otherwise occur due to temperature fluctuations, degradation of circuit operation, etc.

SUMMARY OF THE INVENTION

In accordance with a first important aspect of the present invention, apparatus for indicating level of material comprises a cable vertically suspended so as to contact and be surrounded by the material. The cable is suspended from a cam follower mechanism that engages a cam coupled to a motor for selectively introducing slack in the cable, such that the upper portion of the cable unsupported by the material engages and is suspended from a cable-weighing mechanism such as a load cell. Circuitry is responsive to cable weight measured by the load cell for indicating level of the material. The motor preferably comprises a rotary electric motor having a horizontal axis of rotation perpendicular to the cable. The cam preferably comprises a cam plate coupled to the motor to rotate about the motor axis and having an asymmetric periphery surrounding the axis of rotation. The cam follower mechanism preferably comprises an arm pivotally mounted in fixed position adjacent to the cam plate and supporting a roller that engages the cam plate periphery. The cable is suspended from the pivot-remote end of the arm, so that weight of the cable and the roller arm holds the roller in contact with the cam plate periphery.

The cam-drive motor is periodically and selectively activated by associated electronics for rotating the cam plate in a continuous motion that consists of one complete revolution of the cam plate. Upon initial rotation of the cam plate, the follower enters a first portion of the cam periphery in which the cable is slackened, at which point weight of the unsupported portion of the cable is measured. Continued rotation of the cam plate brings the follower into engagement with a second portion of the cam plate periphery in which the slack is gradually removed from the cable and the cable end is raised to its initial position. A tab or the like is coupled to the motor drive shaft and cooperates with an optical sensor for terminating motion at the cam-drive motor when the cam and follower mechanisms have returned to their original or home positions.

The motor is coupled to the cable-suspension cam, in the preferred embodiment of the invention, through a drive mechanism that includes facility for absorbing shock loads on the cable. More specifically, the motor drive shaft is coupled to a drive arm. The cam, which is freely rotatable on the drive arm coaxially with the shaft, has apertures that receive the free ends of the drive arm. Coil springs are captured in compression between the ends of the drive arm and the opposing portions of the cam apertures, and urge the drive arm in the direction of driving engagement with the cam plate. In the event of a shock load on the suspended cable, such load is absorbed by the arm-biasing springs and is not transferred by the cam mechanism back to the drive motor, which might strip the gears of or otherwise damage the drive mechanism.

In the presently preferred embodiment of the invention, the motor is mounted on one side of a vertical support wall, with the motor drive shaft extending through suitable bearings to the cam mechanism disposed on the opposing side of the support wall. The load cell is also mounted on the motorside of the support wall, and is operatively coupled to the cable beneath the cam mechanism by a load transfer shaft and a pair of load arms. The load arms preferably are of substantially identical length, and the arm positioned beneath the cable-suspension cam includes facility for supporting the slackened portion of the cable along a line of contact substantially perpendicular to and intersecting the cable. Thus, load applied to the load cell by the slacked portion of the cable remains substantially constant for a given slackened cable length, and is substantially independent of side loads on the cable due, for example, to non-uniform material distribution surrounding the cable. Further, the apparatus electronics, including the motor-drive and cable-weighing electronics, is positioned on the motor-side of the support wall. Covers sealingly engage the support wall, and thereby effectively define separate electrical and mechanical chambers on opposing side of the support wall, facilitating explosion-proof rating of the apparatus.

Yet another important aspect of the present invention has particular utility in suspended-cable apparatus of the subject character, but also finds utility in other apparatus for indicating conditions of materials over a preselected continuous range. A material probe, such as a suspended cable, operatively engages the material throughout the preselected range and is coupled to circuitry responsive to variations in operating characteristics of the probe as a function of materials conditions. An analog current output signal over a predetermined current range, such as the industry-standard 4 ma to 20 ma current output range, is provided as a continuous function of operating characteristics at the probe, and thus as a continuous function of material conditions over the preselected range. Thus, this aspect of the invention finds utility not only in suspended-cable apparatus of the subject type, but also in r.f. capacitance-type devices, drop-weight devices, ultrasonic devices and other devices of conventional character for measuring material level, as well as in devices for measuring other material characteristics such as thickness or moisture content.

In accordance with this aspect of the present invention, the indicating circuitry includes facility for establishing a desired current output corresponding to measured operating characteristics at the probe, measuring actual current output, and then correcting actual current output as a function of a difference between the desired and measured outputs. Thus, output current is set and maintained at a level preselected to correspond to a given condition at the probe independently of variations that might otherwise occur due to temperature fluctuations and other factors. Most preferably, the controlled output current is provided by a current amplifier driven by a microprocessor-based controller. The controller receives a first input, through an a/d convertor or the like, indicative of conditions at the probe, such as weight of the unsupported portion of the cable, and establishes a desired current output corresponding to such conditions. Such desired current output may be established through suitable real-time algorithms as a direct function of material condition input, or may be retrieved from a look-up table that has been programmed and stored in microprocessor memory. In either case, the microprocessor-based controller drives the current amplifier to establish an actual current output, which is then measured by the controller through a current feedback circuit and compared with desired current output. The signal to the current amplifier is then tailored or adjusted to obtain the desired current output as a function of a difference between desired and actual current outputs. In this way, temperature-induced fluctuations in the operating characteristics of the current amplifier and/or variations in the amplifier load are automatically accommodated in accordance with this feature of the invention.

BRIEF DESCRIPTION OF THE DRAWINGS

The invention, together with additional objects, features and advantages thereof, will be best understood from the following description, the appended claims and the accompanying drawings in which:

FIG. 1 is a partially sectioned elevational view of suspended-cable apparatus for determining the level of material in a vessel in accordance with a presently preferred implementation of the invention;

FIGS. 5 and 6 are fragmentary sectional views taken substantially along the respective lines 5—5 and 6—6 in FIG. 2;

FIG. 7 is a fragmentary sectional view taken substantially along the line 7—7 in FIG. 6; and FIG. 8 is a functional block diagram of apparatus control electronics in accordance with a presently preferred embodiment of the invention.

DETAILED DESCRIPTION OF PREFERRED EMBODIMENT

Figure 2:
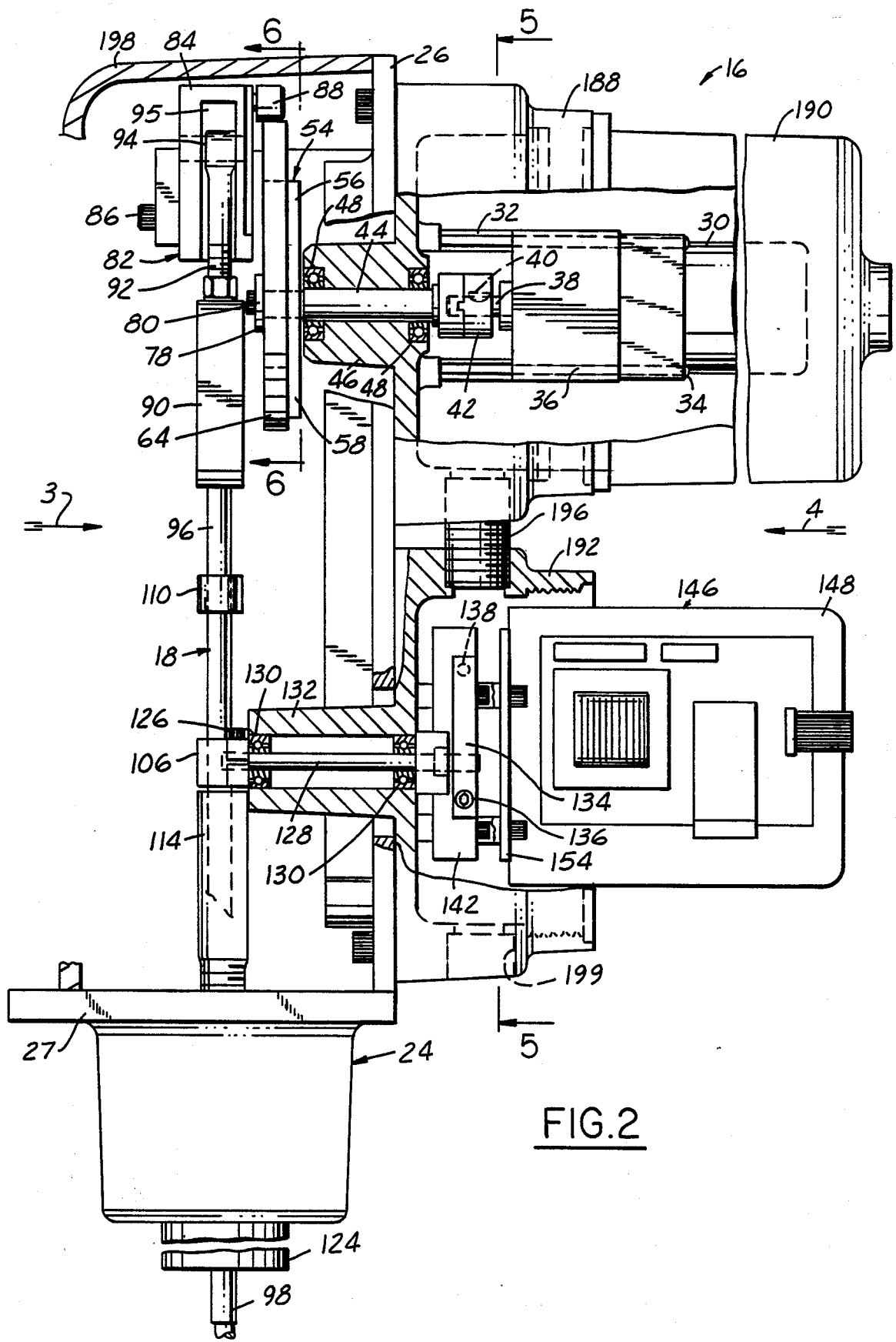
FIG. 2 is a fragmentary partially sectioned elevational view of the apparatus in FIG. 1 on an enlarged scale.

FIG. 1 illustrates a system 10 for measuring level of material 12 in a vessel 14 in accordance with a presently preferred implementation of the invention. Apparatus 16 is mounted on the upper portion or top of vessel 14, and a cable 18 is suspended from apparatus 16 throughout the vertical length of vessel 14 over which material level is to be measured. Material 12 is fed to vessel 14 by a chute 20 coupled to a suitable conveying mechanism (not shown, and may be withdrawn by a chute 22 likewise coupled to a suitable conveying mechanism. To the extent thus far described, system 10 is essentially similar to that disclosed in U.S. Pat. No. 4,676,099, to which reference is made for purposes of background.

Figure 4:
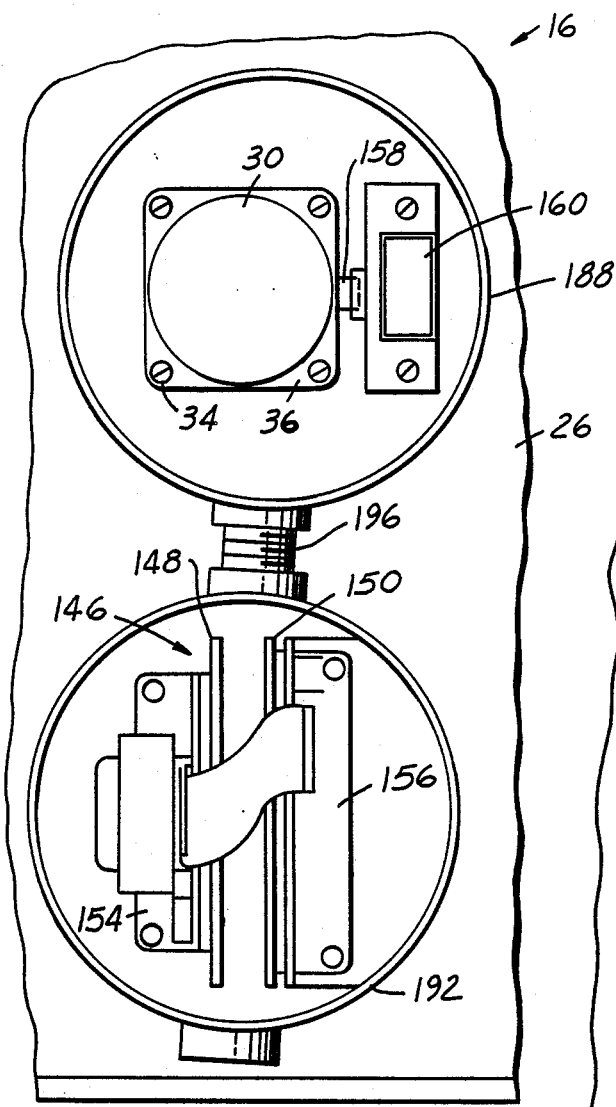
FIG. 4 is a fragmentary side elevational view taken substantially in the direction 4 in FIG. 2 with covers removed.
Figure 5:
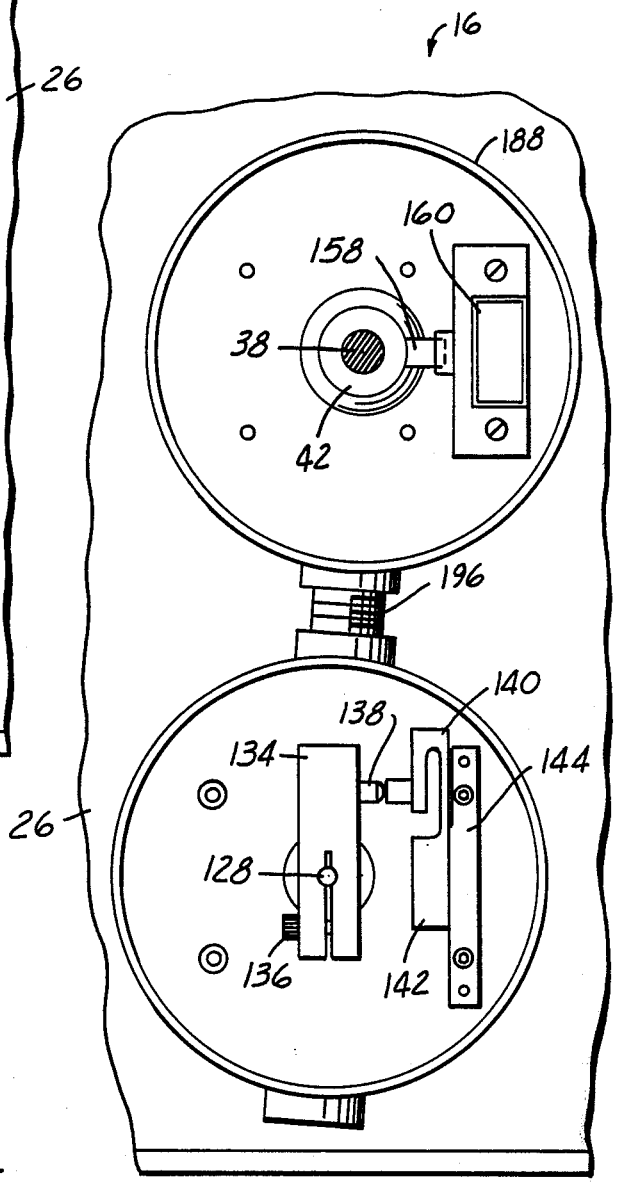

Apparatus 16 is illustrated in detail in the drawings and comprises a support 24 including a wall 26 integrally upstanding from a base 27 and adapted to be disposed in vertical orientation when support 24 is mounted by a suitable pipe or gland 28 (FIG. 1) at the upper portion of vessel 14. An electric motor 30 (FIGS. 1 and 4) is mounted by stand-offs 32 and screws 34 to one side of support wall 26 adjacent to the upper edge thereof. A reduction gear drive 36 couples motor 32 to an output shaft 38 (FIGS. 2 and 5). Shaft 38 is connected by a key 40 (FIG. 3) to a coupler 42, which in turn is fastened to a drive shaft 44 (FIGS. 2, 6 and 7) that extends through a boss 46 on wall 26 and is rotatably supported by the bearings 48 contained therewithin. The free end of drive shaft 44 is keyed at 50 (FIG. 7) to the central cylindrical collar 52 of a cam drive 54 positioned on the motor-remote side of wall 26. A pair of arms 56, 58 integrally project radially outwardly from drive collar 52 and terminate in axially extending substantially rectangular fingers 60, 62. A cam plate 64 is rotatably carried by collar 52 and has a pair of diametrically spaced rectangular apertures 66, 68 that receive drive fingers 60, 62 respectively. A pair of tangentially oriented coil springs 70, 72 (FIGS. 3 and 6) are respectively positioned within apertures 66, 68, and are captured in compression between drive fingers 60, 62 and the opposing portions of the respective apertures. Each spring 70, 72 is seated within a substantially cylindrical pocket 74, 76 in the associated drive finger to hold the springs in position. Cam plate 64 and cam drive 54 are captured by a bearing washer 78 fastened by a screw 80 onto the axial end of shaft 44.

Cable 18 is suspended from a cam follower 82 (FIGS. 2, 3 and 6) that comprises a follower arm 84 pivotally mounted at one end by a pin 86 affixed to support wall 26 adjacent to cam plate 64. A roller bearing 88 is cantilevered from the free or pivot-remote end of arm 84 at a position to engage the asymmetric periphery of cam plate 64. A yoke 90 (FIGS. 2 and 3) is pivotally suspended by a swing bolt 92 from a pin 94 carried by arm 84 adjacent to roller 88 within an open slot 95 at the pivot-remote end of arm 84. Cable 18 includes a termination sleeve 96 swaged or otherwise permanently secured to the upper end of a laid wire rope 98. Sleeve 96 has a threaded end 100 that projects upwardly coaxially with bolt 92 through an opening in the lower reach of yoke 90. A nut 102 is threaded onto sleeve end 100 and is secured by a key against rotation. A thrust bearing 104, preferably a roller-type thrust bearing having axially opposed races, is positioned between nut 102 and the lower reach of yoke 90 so as to permit free rotation of sleeve 96 with respect to yoke 90. Sleeve 96 extends downwardly from yoke 90 through an arm 106 (FIGS. 2 and 3) having a passage 108 that surround sleeve 96. A collar 110 is affixed to sleeve 96 above arm 106 and is positioned with respect to sleeve 96 so as to engage arm 106 when cable 18 is slackened. In particular, a pair of pointed fingers 112 (FIG. 3) are formed on the upper surface of arm 106 at diametrically opposed positions with respect to passage 108. The flat lower surface of collar 110 thus engages arm 106 along a line of contact that intersects and is perpendicular to the axial dimension of cable 18. A sleeve 114 surrounds cable 18 and is adjustably threadably received in an adapter 116 fastened by the screws 118 surrounding the cable opening in the base 27 o support 24. The upper edge of sleeve 114 is positioned beneath arm 106 and functions as an adjustable stop, as will be described. A resilient bellows 120 is fastened by the adapters 122 surrounding the cable opening, and is engaged by a conical weight 124 affixed to cable 18. In the upper position of cable 18, as shown in the drawings, weight 124 and bellows thus seal the interior of apparatus 16 from dust or the like within the atmosphere of vessel 14 (FIG. 1).

Arm 106 has a split end clamped by a screw 126 to a load transfer shaft 12 (FIGS. 2, 3 and 5) that is supported by a pair of bearings 130 carried within a hollow boss 132 integral with support wall 26. An actuator arm 134 (FIGS. 2 and 5) has a split end clamped by a screw 136 to the opposing end of shaft 128 on the motor-side of support wall 26. A button 138 is carried by arm 134 and extends tangentially therefrom to engage the actuator 140 of a load cell 142. Load cell 142 is mounted by a bracket 144 to support wall 26. Button 138 is spaced radially from the axis of shaft 128 by a distance substantially equal to the distance of fingers 112 (FIG. 3) from the axis of shaft 128, so that there is a 1:1 transfer of slackened cable weight by arms 106, 134 and shaft 128 to actuator 140 of load cell 142. The apparatus electronics 146 (FIGS. 2 and 4), to be described in detail in conjunction with FIG. 8, takes the form of a pair of printed circuitboard assemblies 148, 150 mounted by suitable brackets 152, 154 to support wall 26 over load cell 142. A tab 158 (FIGS. 4 and 5) is affixed to shaft coupler 42 (FIGS. 2 and 5) and projects radially therefrom. An optical sensor 160 is mounted to support wall 26 beneath motor 30 and radially adjacent to shaft coupler 42 at a position to detect passage of tab 158. When tab 158 passes through sensor 160, the sensor provides an electrical signal to control electronics 146 to indicate that the drive shaft and cam have reached the home position illustrated in the drawings. A mechanical switch could be employed in place of optical sensor 160.

Referring to FIG. 8, apparatus control electronics 146 preferably comprises a microprocessor-based controller 162 having associated memory into which all operating algorithms and data are preprogrammed in the usual and conventional manner. Controller 162 receives inputs through an a/d convertor 164 from tab sensor 160, from a variable resistor 166 for adjusting measurement cycle time, from a pushbutton 168 for manually initiating a measurement cycle, and from a second pushbutton 170 for incrementally jogging rotation of motor 30 and cam plate 64. Load cell 142 provides an output to an amplifier 172, and thence to a further input port of a/d convertor 164. Controller 162 also receives an input from the reset circuitry 174 having an associated manual pushbutton 176 a well as automatic power-on circuitry for resetting operation of controller 162. Controller 162 provides an output through a d/a convertor 178 to a current amplifier 180. Current amplifier 180 provides a current output to remote indicating circuitry e.g. a meter 181 over a preselected current range corresponding to range of material levels to be measured. One industry standard current range is from a current of 4 ma, indicating a low material level or empty vessel condition, to 20 ma indicating a high material level or full vessel condition. Actual current output of amplifier 180 is measured by a current sensor 182 that provides a corresponding signal to a further input port of a/d convertor 164. Input ports of convertor 164 are selectively polled by controller 162 in the usual manner. Controller 162 also provides an output to circuitry 184 for adjusting offset of load cell amplifier 172. A further output of controller 162 drives motor 30 through appropriate drive electronics 186.

Motor 30 and tab sensor 160 (FIGS. 2, 4 and 5) are surrounded by an internally threaded cylindrical flange or ledge 188 integral with wall 26 and into which a cove 190 (FIGS. 1 and 2) is removably received. Likewise, load cell 142 and electronics 144 are surrounded by an internally threaded ledge 192 integral with support wall 26 and into which a cover 194 (FIG. 1) is removably received. A fitting 196 extends between ledges 188, 192 (FIGS. 2, 4 and 5) for sealed passage of electrical conductors therebetween. A further cover 198 (FIGS. 1 and 2) is removably fastened to support wall 26 and base 27 to enclose the cam drive and cable suspension mechanisms. Covers 190, 194 and 198 thus cooperate with support base 27 and support wall 26 to form separate chambers on opposite sides of support wall 26 enclosing the apparatus electronics and the apparatus mechanical portions. Further, the apparatus electronics chambers formed by covers 190, 194 and support wall 26, and containing all of the apparatus electrical components, are sealed from the mechanical chamber formed by cover 198 and support 24 which in turn is open to the vessel through pipe 114 when the cable is slackened. Such division of the apparatus components into separate electrical and mechanical chambers not only provides enhanced reliability of all components, but also facilitates explosion-proof construction required in many applications for insurance reasons. An internally threaded opening 199 (FIG. 2) in the lower portion of ledge 192 provides for connection to remote indicating means.

In operation, upon initial application of power to control electronics 146, controller 162 FIG. 8) is automatically reset and drives motor 30 to position cam 64 in the home position illustrated in the drawings, if the cam is not already in that position as would be indicated by tab 158 and shaft tab sensor 160. Thereafter, controller 162 automatically executes a level-measurement cycle at periodic intervals adjustably preselected by resistor 166, or upon depression f switch 168. At the onset of each measurement cycle, motor 30 is energized to rotate cam plate 64 in the direction 200 in FIGS. 3 and 6. Upon initial rotation of the cam plate 64, follower roller 88 encounters a first portion 202 of the cam periphery in which cam radius decreases rapidly. Follower arm 84 thus pivots in the clockwise direction as viewed in FIG. 3 so as to lower yoke 90 and slacken that portion of cable 18 unsupported by surrounding material 12 (FIG. 1). When follower 88 encounters the second portion 204 of the cam periphery, which provides a dwell at minimum cam radius, the output of load cell 142 peaks and is read by controller 162.

The load cell output, indicative of weight of cable 18 unsupported by material, and thus directly indicative of level of material surrounding the cable, is translated by controller 162 into a corresponding desired current output indicative of measured material level. Such desired current output may be obtained either through prestored mathematical algorithms that operate in real time on the load cell output signal, or by employing the load cell output signal to access a look-up table prestored in controller memory and relating load cell output to corresponding output current. For example, in the exemplary and industry-standard 4 ma to 20 ma output signal range, a load cell signal that indicates a material level of 7.8 m may correspond to a desired-current signal of 12.3 ma. Controller 162 thus drives current amplifier 180 with a control signal necessary to provide the desired 12.3 ma current output, and then determines actual current output through current sensor 182 and convertor 164. If the current is not at the desired output level, the control signal to current amplifier 180 is automatically adjusted accordingly. For example, if the actual current output is 11.7 ma as compared with a desired output of 12.3 ma, the control signal to current amplifier 180 is increased (or decreased) until an actual current output of 12.3 ma is detected. Thus, in accordance with this feature of the invention, current output is automatically adjusted to the desired level to compensate for any variations in circuit characteristics or load.

Figure 3:
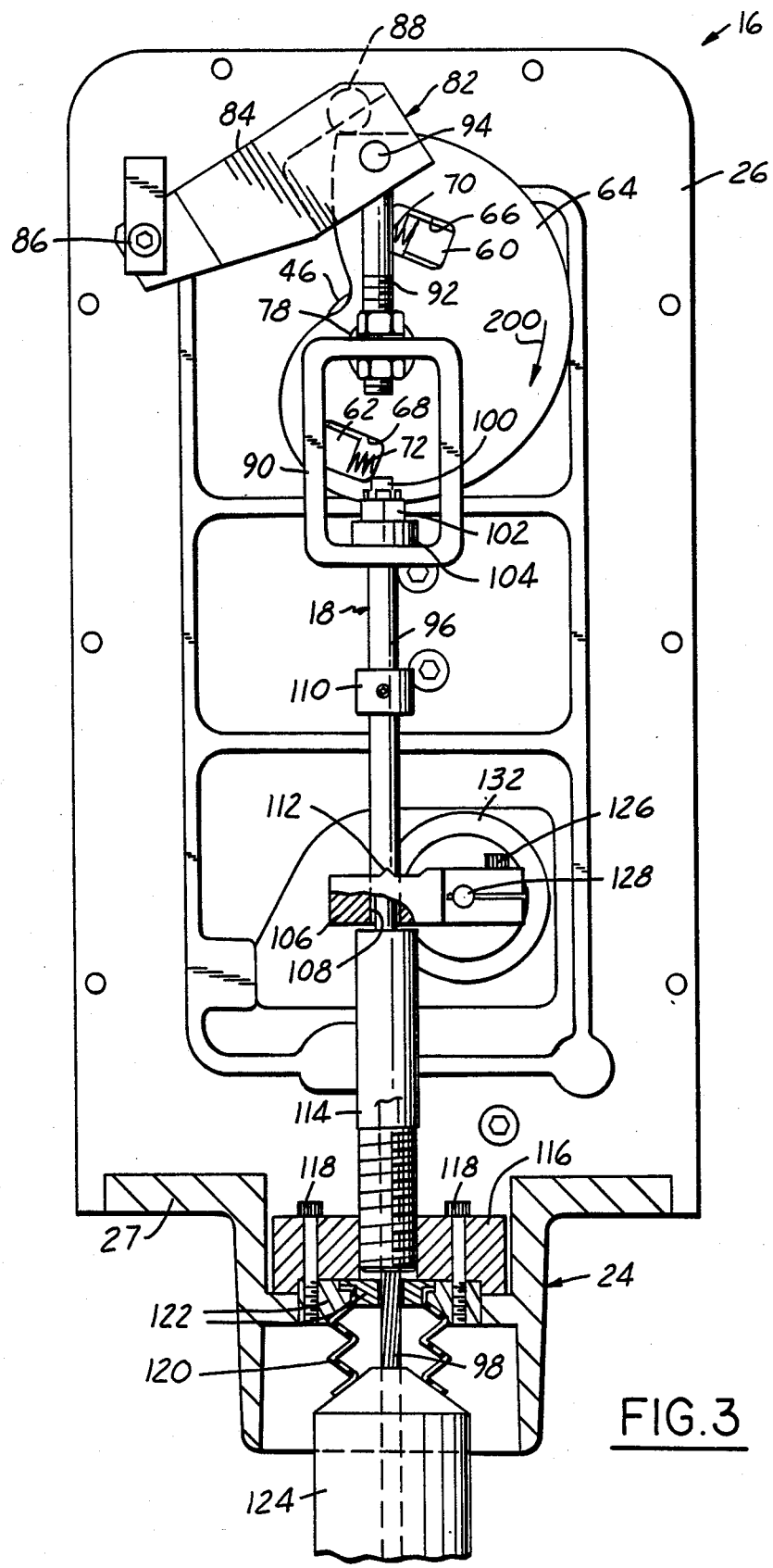
FIG. 3 is a partially sectional side elevational view of the apparatus in FIG. 2 with cover removed and taken substantially from the direction 3 in FIG. 2.

In the meantime, motor 30 continuously and uninterruptedly drives cam plate 64 in direction 200 (FIGS. 3 and 6). Follower roller 88 encounters a third portion 206 of the cam plate periphery in which radius of the cam plate periphery gradually increases from the minimum radius at 204 to a portion 208 at substantially constant maximum radius from the cam plate axis. As roller 88 encounters cam plate periphery portion 208, cable 18 is restored to the fully raised position illustrated in the drawings. A flat 209 helps center the rest or home position of the assembly. When tab 158 (FIGS. 4 and 5) again registers with sensor 160, the measurement cycle is terminated. Switch 168 (FIG. 8) allows manual initiation of a measurement cycle independently of resistor 166 for maintenance and calibration purposes, and switch 170 allows the technician to jog cam plate 64 in the direction 200 as required for maintenance and calibration purposes. Pipe 114 is adjustably positioned as a stop to support arm 106, and to prevent overload and damage to load cell 144, in the event of excess load or drag on cable 18.

It will thus be appreciated that the presently preferred embodiment of the invention, disclosed in detail hereinabove, fully satisfies all of the objects and aims previously set forth. Furthermore, it will be appreciated that that aspect of the present invention through which output current is automatically measured and controlled to obtain a predetermined current output level corresponding to measured material level, finds application in level measurement systems other than suspended-cable type systems, and indeed finds application in a wide variety of system for indicating any preselected condition of materials as a continuous current output function over a preselected material condition and corresponding current range, of which the 4 ma to 20 ma range previously discussed is only exemplary.

The invention claimed is:

1. Apparatus for indicating level of material comprising a cable, means vertically suspending said cable in the material so as to contact and be surrounded by the material, said cable-suspending means including means for selectively introducing slack in said cable, weighing means and means coupling said cable to said weighing means when said cable is slackened such that a slackened portion of said cable is supported by said weighing means for indicating level of material as a function of weight of said slackened portion of said cable, characterized in that said slack-introducing means comprises a rotary motor having an axis of rotation perpendicular to said cable, a cam including a cam plate coupled to said motor to rotate about said axis and having a contoured periphery surrounding said axis, and cam follower means including roller means mounted in engagement with said periphery and supporting said cable on said cam.

2. The apparatus as set forth in claim 1 wherein said roller means comprises a roller arm pivotally mounted at one end in fixed position adjacent to said cam plate and having a follower roller carried at another end of said arm in engagement with said cam plate periphery.

3. The apparatus set forth in claim 2 wherein said cable includes means suspending said cable adjacent to said other end of said arm, weight of said cable and said roller arm holding said roller in contact with said cam plate periphery.

4. The apparatus set forth in claim 1 wherein said slack-introducing means further includes drive means for rotatably coupling said motor to said cam plate, and spring means urging said drive means into rotatable engagement with said cam plate and for absorbing backlash loads on said cable.

5. The apparatus set forth in claim 4 wherein said drive means comprises a drive arm coupled to said motor and extending radially of said axis, and an aperture in said cam plate receiving an axis-remote end of said drive ar, and wherein said spring means comprises a coil spring captured between said axis-remote end of said arm and a surrounding portion of said cam aperture.

6. The apparatus set forth in claim 5 wherein said drive arm includes first and second radially oppositely extending arm portions having ends received in corresponding apertures in said cam plate, and first and second coil springs respectively received between said ends and opposing portions of said apertures.

7. The apparatus set forth in claim 6 wherein said arm portion ends have pockets in what said springs are seated.

8. The apparatus set forth in claim 7 wherein said drive arm further comprises a central cylindrical collar coaxial with said axis, said cam plate being rotatably mounted on said collar.

9. The apparatus set forth in claim 1 wherein said cam plate has a contoured periphery surrounding said axis, said periphery including a first portion at maximum radius from said axis, a second portion adjacent to said first portion having rapidly decreasing radius with respect to said axis, said second portion terminating at minimum peripheral radius from said axis, and a third portion of gradually increasing radius extending from said minimum radius to said maximum radius, and wherein said motor is so coupled to said cam plate that said follower means engages said first, second and third portions of said periphery in sequence.

10. The apparatus set forth in claim 9 wherein said motor comprises on electric motor having an output shaft coupled to said cam plate, and wherein said slack-introducing means comprises means for selectively applying electrical power to said motor.

11. The apparatus set forth in claim 10 wherein said slack-introducing means further comprises means coupled to said motor shaft for arresting operation of said motor when said follower means is in engagement with said first portion of said cam plate periphery.

12. The apparatus set forth in claim 11 wherein said operation-arresting means comprises means coupled to said shaft to rotate about said axis, and means positioned to detect rotation of said shaft-coupled means when said follower means is in engagement with said first portion of said cam plate periphery.

13. The apparatus set forth in claim 1 wherein said weighing means comprises a load cell having an arm surrounding said cable and means on said cable for engaging said arm, said arm and arm-engaging means having opposed surface constructed for abutting engagement on a line perpendicular to said cable.

14. The apparatus set forth in claim 13 further comprising stop means positioned beneath said arm to prevent overload of said load cell.

15. The apparatus set forth in claim 14 wherein said stop means includes means for adjustably positioning said stop means with respect to said arm.

16. The apparatus set forth in claim 1 wherein said level-indicating means comprises means for providing an analog current output over a predetermined range as a continuous function of level of material.

17. The apparatus set forth in claim 16 wherein said level-indicating means includes means responsive to said weighing means for establishing a corresponding desired current output, means for measuring actual current output, and means for correcting said actual current output as a function of a difference between said desire output and said actual output.

18. The apparatus set forth in claim 17 wherein said level-indicating means comprises a microprocessor-based controller, an a/d convertor having a first port for connecting said weighing means to said controller, and a d/a convertor responsive to said controller for providing said current output, said current-measuring means including means connected between said current output and a second port of said a/d convertor.

19. Apparatus for measuring level of material comprising: support means including a support wall adapted to be mounted in vertical orientation above a material whose level is to be measured; an electric motor mounted on one side of said support wall and having a drive shaft extending horizontally through said support wall; cam means including a cam plate having a contoured peripheral edge, means coupling said cam plate to said shaft on the opposing side of said wall such that said peripheral edge is rotatable by said motor in a substantially vertical plane, and follower means including a roller in engagement with each peripheral edge; a cable vertically suspended for said follower means on said opposing side of said wall through said support means and into the material; weighing means including a load cell mounted on said one side of said support wall, means surrounding said cable on said opposing side of said wall, and means extending through said wall to couple said load cell to said cable-surrounding means; and an electronic controller carried by said support means on said one said of said wall, including means for energizing said motor so as to rotate said cam means and introducing slack in said cable such that a portion of said cable unsupported by the material as supported by said weighing means, and means responsive to said load cell for indicating level of material as a function of weight of said unsupported portion of said cable.

20. The apparatus set forth in claim 19 wherein said drive arm includes first and second radially oppositely extending arm portion having ends received in corresponding apertures in said cam plate, said first and second coil springs respectively received between said ends and opposing portions of said apertures.

21. The apparatus set forth in claim 20 wherein said level-indicating means includes means responsive to said weighing means for establishing a corresponding desired current output, means for measuring actual current output, and means for correcting said actual current output as a function of a difference between said desired output and said actual output.

22. The apparatus set forth in claim 19 wherein said means coupling said cam plate to said shaft comprises a drive arm coupled to said shaft, an aperture in said cam plate receiving said arm, and a coil spring positioned between said arm and said cam plate urging said arm into driving engagement with said cam plate.

23. The apparatus set forth in claim 22 wherein said drive arm includes first and second radially oppositely extending arm portions having ends received in corresponding apertures in said cam plate, and first and second coil springs respectively received between said ends and opposing portions of said apertures.

24. The apparatus set forth in claim 23 wherein said roller means comprises a roller arm pivotally mounted at one end in fixed position adjacent to said cam plate and having a follower roller carried at another end of said arm in engagement with said cam plate periphery.

25. The apparatus set forth in claim 24 wherein said cable includes means suspending said cable adjacent to said other end of said arm, weight of said cable and said roller arm holding said roller in contact with said cam plate periphery.

26. The apparatus set forth in claim 19 whereas said controller further includes means coupled to said shaft on said one side of said wall for indicating a position of said shaft corresponding to a fully raised position of said cable, and means for selectively cycling said motor through one complete revolution to slacken and then raise said cable.

27. The apparatus set forth in claim 26 wherein said controller includes means for cycling said motor at periodic intervals.

28. The apparatus set forth in claim 27 wherein said controller further includes means for adjustably setting said intervals.

29. The apparatus set forth in claim 19 wherein said load cell-coupling means comprises a load transfer shaft extending through said wall and a first arm coupling said shaft to said load cell on said one side of said wall, and wherein said cable-surrounding means comprises a second arm coupled to said load transfer shaft.

30. The apparatus set forth in claim 29 wherein said first and second arms are of substantially identical dimension radially of said load transfer shaft.

31. The apparatus set forth in claim 29 further comprising a sleeve adjustably threadably received in said support means surrounding said cable beneath said second arm, said sleeve having an upper edge adjustably positionable beneath said second arm to support said second arm in the event of excess load on said cable.

32. The apparatus set forth in claim 19 wherein said support means comprises cover means engaging said wall and defining first and second isolated chambers on respective sides of said wall.

33. Apparatus for indicating a condition of material over a preselected condition range comprising: probe means positioned operatively to engage the material throughout said range, means responsive to variations in operating characteristics at said probe means as a function of said material conditions, and means for providing a analog current output over a predetermined current range as a continuous function at said operating characteristics at said probe means, characterized in that said current-providing means comprises means for establishing a desired current output corresponding to said operating characteristics, means for measuring actual current output, and means for correcting said actual current output as a function of a difference between said actual and desired outputs.

34. The apparatus set forth in claim 33 wherein said current-providing means comprises a current amplifier, and a microprocesser-based controller having a first input responsive to said operating characteristics, an output coupled to said current amplifier, means for initially setting at said controller output a signal corresponding, to said desired current output at said current amplifier, a second input responsive to actual current output of said current amplifier, and means for varying said signal at said controller output as a function of said difference between said desired and actual current outputs.

35. The apparatus set forth in claim 34 wherein said controller inputs include an a/d convertor having ports responsive to said operating characteristics and said actual current output, and wherein said controller output comprises a d/a convertor coupling said controller to said current amplifier.

36. The apparatus set forth in claim 34 wherein said controller further comprises means forming a look-up table relating said operating characteristics to said signal.

37. The apparatus set forth in claim 36 for indicating level of material wherein said probe m comprises a cable, means vertically suspending said cable in the material so as to contact and be surrounded by the material, said cable-suspending means including means for selectively introducing slack in said cable, and wherein said variations-responsive means comprises weighing means and means coupling said cable to said weighing means for indicating level of material as a function of weight of said cable.

* * * * *